United States Patent [19]

Ulrich

[11] Patent Number: 5,601,625
[45] Date of Patent: Feb. 11, 1997

[54] PROCESS AND DEVICE FOR REMOVING HEAVY METALS AND COMPOUNDS CONTAINING HEAVY METALS

[75] Inventor: Klaus H. Ulrich, Heiligenhaus, Germany

[73] Assignee: Mannesmann Aktiengesellschaft, Düsseldorf, Germany

[21] Appl. No.: 352,341

[22] Filed: Dec. 7, 1994

[30] Foreign Application Priority Data

Dec. 7, 1993 [DE] Germany .......................... 43 42 494.5

[51] Int. Cl.⁶ .......................................... B01D 51/00
[52] U.S. Cl. .......................................... 55/383; 55/410
[58] Field of Search ...................... 55/383, 410, 418; 96/136, 139, 140

[56] References Cited

U.S. PATENT DOCUMENTS 4,813,978  3/1989  Hirth et al. ........................ 55/5
5,264,654  11/1993  Kreft et al. ..................... 588/205
5,298,227  3/1994  Hirth et al. ..................... 423/1

FOREIGN PATENT DOCUMENTS 6-23222  2/1994  Japan ........................... 96/136

Primary Examiner—Romulo H. Delmendo
Attorney, Agent, or Firm— Cohen, Pontani, Lieberman, Pavane

[57] ABSTRACT

A process and device for removing heavy metals and compounds containing heavy metals from waste gas of a metallurgical vessel which is charged with materials posing disposal problems. The flue gas collecting in the metallurgical vessel is sucked out of the vessel as a main gas flow and cleaned in a gas cleaning system. The flow of cleaned gas is guided to an after-burning device. A portion of the clean flue gas is diverted frown the main gas flow leading to the after-burning device. The diverted flow portion is cooled and guided back to the main flow of flue gas where it is mixed with the flue gas before the main flow of flue gas enters the gas cleaning system.

8 Claims, 2 Drawing Sheets

PROCESS AND DEVICE FOR REMOVING HEAVY METALS AND COMPOUNDS CONTAINING HEAVY METALS

BACKGROUND OF THE INVENTION

1. Field of the Invention

The invention concerns a process for removing heavy metals and compounds containing heavy metals from the waste gas of metallurgical vessels which are charged with materials posing disposal problems and directly connected with a gas cleaning system and which are fed to a gas after-burning device. The invention further relates to a device for carrying out the process.

2. Description of the Prior Art

In high-temperature metallurgical processes, in particular smelting of residual materials containing nonferrous metal, portions of compounds containing heavy metals or the heavy metals themselves are volatilized in the prevailing temperatures of more than 1000° C. In order to separate into slag which can be disposed of in dumps or landfills, or to separate reusable metal alloys and filter dust, this volatilizing reaction is deliberately aimed for in the processes for disposal of residual materials by adjusting the oxygen potential in the melt contained in the metallurgical vessels. In these processes the filter dust is separated from the process waste gases.

The problem materials containing heavy metal are contained in the dust as completely as possible and in the most concentrated form possible and can be disposed of simply and economically in such concentrated form in separate processes.

The gases containing the steam which is formed in these metallurgical processes and which contains metal or metal compounds must be cooled before being introduced into filter systems. Direct cooling of the gas by sprayed water increases the steam content in the gas and accordingly results in a lower dew point. This process becomes problematic when hygroscopic dusts (e.g., metal chlorides, metal carbonates or metal sulfates) are to be separated in the filter, because these dusts greedily absorb water and accordingly gum up the filter surfaces.

The disadvantages of this wet gas system for cloning flue gases have already been referred to in EP 0 158 689, which proposes a dry gas system in which the blast furnace gas is desulfurized by burning the hot contaminated blast furnace gas in a combustion chamber which is arranged immediately downstream of the furnace and is charged with combustion air. It was already known prior to this proposal that soiling and encrustation of the nest of tubes in the recuperators also occurs in the dry gas system. That is, when this indirect cooling is effected, greasy materials contained in the waste gas condense on the cooling surfaces where they accumulate in layers, and impede the cooling effect as the layers increase in thickness. These layers of greasy substances further cause an increased drop in pressure throughout the entire waste gas system by reducing the cross sections of the waste gas lines until, in extreme cases, gas can no longer be sucked out. EP 0 158 689 describes a process and a device in which the hot contaminated blast furnace gas is burned in combustion chambers charged with combustion air and a desulfurization agent in powder form is fed into the combustion chamber. Low-temperature air is used as a carrier for the desulfurizing powder so that the flue gas with the injected materials, i.e., the earlier air and desulfurizing agent, is cooled. This process has the disadvantage that it uses large quantities of gas, i.e., flue gas and added combustion air, which is not fed to the gas cleaning arrangement until after the after-burning. Moreover, an external gas, namely fresh air, is added to the flue gas, which can lead to uncontrollable chemical reactions of the problem materials.

Further, EP 0 299 340 B1 discloses a process for removing heavy metals and/or heavy metal compounds in which filter dust is heated in a reaction vessel at least until reaching the evaporation temperature of the heavy metals and/or heavy metal compounds to be removed and in which at least the metallic materials in the form of steam are subsequently quenched in a condenser or cooler and changed to liquid or solid state. Before these materials evaporate, very fine dust particles with particle sizes of less than 5 nm are separated out in the cold state and the residual portion of filter dust is fed to the reaction vessel. The raw dust is fed directly to the reaction vessel and the flue gas is cooled by a cooler which results in the aforementioned disadvantages of accumulating layers on the cooling surfaces.

SUMMARY OF THE INVENTION

Accordingly, it is an object of the present invention to provide a process, and a device required for this process, for removing heavy metals and compounds containing heavy metals in which gas proceeding from metallurgical vessels can be cleaned and after-burned in a simple manner while keeping the flue gas to be cleaned at a minimum and preventing caking in the gas feed system.

Pursuant to this object, and others which will become apparent hereafter, one aspect of the present invention resides in a process for removing heavy metals and compounds containing heavy metals from waste gas of a metallurgical vessel which is charged with materials posing disposal problems. The process includes the steps of sucking flue gas collecting in the metallurgical vessel out of the vessel as a main gas flow and cloning the sucked out flue gas in a gas cloning system. After leaving the gas cleaning system, a portion of the main flow of cloned flue gas is diverted. The diverted flow portion is cooled and guided back to the main flow of flue gas where it is mixed with the flue gas before the main flow of flue gas enters the gas cloning system.

A further aspect of the invention resides in a device for removing heavy metals and compounds from waste gas of a metallurgical vessel. The device includes a filter for cloning flue gas coming from the metallurgical filter. A flue gas feed line connects the metallurgical vessel to the filter. A suction device is arranged downstream of the filter for the purpose of sucking the gas from the vessel through the filter. A branch line is arranged downstream of the suction device for diverting a portion of cleaned flue gas from the main flow. A fan is arranged in the branch line for transporting the diverted portion of the cleaned gas through a cooling device and into a device for mixing the cooled, clean gas portion with the flue gas in the flue gas feed line.

According to the invention, the flue gas exiting the metallurgical vessel is cooled by an internal medium. This internal medium is cleaned gas which is drawn off downstream of the filter system in a partial flow. This partial flow of purified gas is cooled and mixed again with the flue gas upstream of the filter in the direction of flow.

There is no contact with coolant water in the present invention. Likewise, problems which occur when admixing external gas, e.g., air, are eliminated. If air were mixed in, the oxygen contained in the air would react with combustible components of the furnace waste gas, which would conflict with the goal of cooling the furnace gases. The caking which normally occurs does not take place when purified gas is used.

The dust particles contained in the flue gas act as condensation seeds. If the dust content in the uncooled flue gas is not sufficient for this purpose, dust can be added. It is suggested that these admixed very fine dust particles have a particle size of less than 0.1 mm and that the added amount range between 1 g/Nm$^3$ and 5 g/Nm$^3$. This condensation of volatile metal compounds in dust particles accompanied by simultaneous cooling of the gas below a temperature which could lead to a sintering of the particles on the wall surfaces of the gas lines prevents condensation deposits on the wall surfaces.

The dust is metered from a hopper and is supplied to a pneumatic feed which also makes use of an internal medium, that is, a partial amount of the cooled and cleaned return gas.

There is no increase in the gas volume exiting the metallurgical vessel, since the internal medium, in this case in purified form, is used for cooling. Design steps and construction steps can be implemented in a corresponding manner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
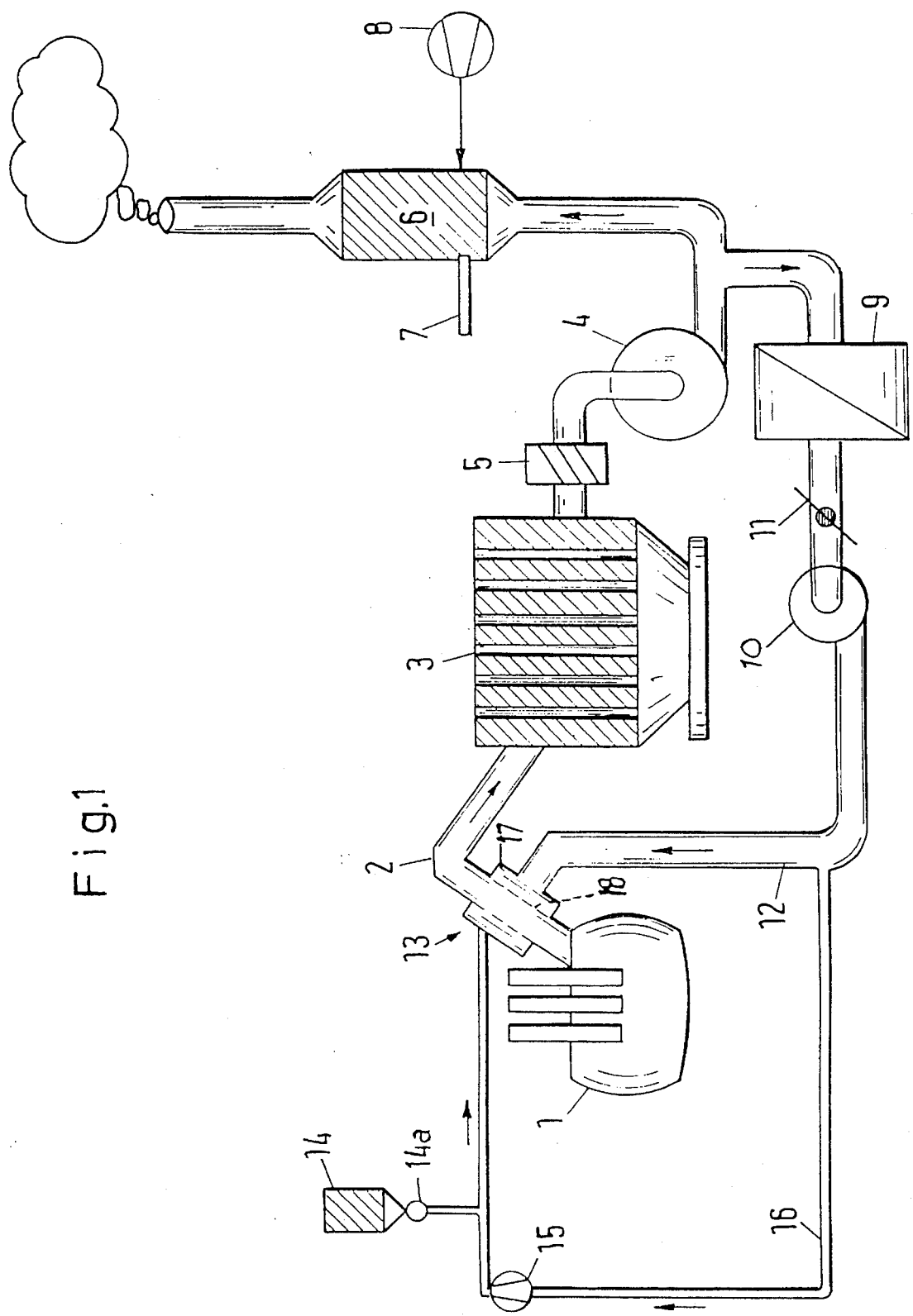
FIG. 1 is a schematic representation of the inventive device.

The metallurgical vessel 1, which is shown as an electric arc furnace, is connected with a filter 3 via a gas pipeline 2. A waste gas fan 4 is arranged downstream of the filter 3 in the direction of flow of the flue gas. A regulating slide 5 is provided between the filter 3 and the waste gas fan 4 for regulating the quantity of waste gas. A branch 12 is provided downstream of the waste gas fan 4 in the direction of flow of the flue gas. A partial amount of the cleaned waste gas is fed through the branch 12 by a fan 10. This partial amount of gas is cooled via a condenser or cooler 9 and the amount of return gas is regulated by the regulator 11.

The gas which is not returned is fed to an after-burning chamber 6 and is guided from there into the atmosphere or (not shown here) is reused as sensible heat, e.g., for preheating scrap or the like. A supporting burner 7 and a combustion air fan 8 are connected with the after-burning chamber 6 for after-burning.

Figure 2:
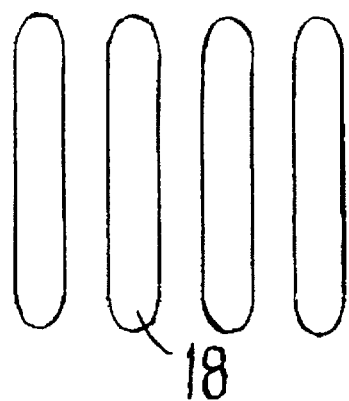
FIG. 2 illustrates slots in the flue gas line for mixing.
Figure 3:
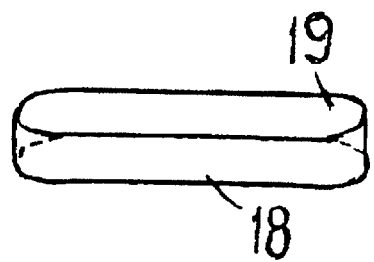
FIG. 3 illustrates members which assist in mixing.

The cleaned and cooled returned partial quantity of waste gas is mixed in with the flue gas flowing into the filter 3 through the gas pipeline 2 in a mixing device 13, which has a housing 17 that surrounds the gas pipeline 2, via the line 12 and openings 18 in the gas pipeline 2. The openings are advantageously constructed as slots in the pipeline 2, as shown in FIG. 2. As shown in FIG. 3, the edges of the slots are provided with members 19 which increase the whirling and intermixing of the clean gas with the flue gas. These members can have a collar-like construction that projects into the gas pipeline 2. The mixing device or chamber can have a wall that is inclined relative to the gas pipeline and through which the clean gas flows via openings.

Upstream of the mixing device 13 in the direction of flow of the cooled waste gas, a partial amount of the cleaned waste gas is drawn off via a conveyor line 16 by a fan 15 for pneumatic transport of dust to the mixing device 13. The conveyor line 16 is connected with a dust hopper 14 having a metering device 14a.

The invention is not limited by the embodiments described above which are presented as examples only but can be modified in various ways within the scope of protection defined by the appended patent claims.

I claim:

1. A device for removing heavy metals and compounds containing heavy metals from waste gas of a metallurgical vessel, comprising: gas cleaning means for cleaning flue gas from the metallurgical vessel, said gas cleaning means including a filter; a flue gas feed line connected between the metallurgical vessel and the filter; suction means downstream of the filter for sucking the flue gas from the metallurgical vessel through the filter and for putting out a flow of clean flue gas; a branch line arranged downstream of the suction means whereby a portion of cleaned flue gas is diverted from the outlet flow of the suction means; fan means connected in the branch line for transporting the diverted portion of cleaned gas; means arranged in the branch line for cooling the diverted clean gas portion; and means for mixing the diverted, cooled clean gas portion with the flue gas in the flue gas feed line.

2. A device according to claim 1, and further comprising after-burning means for after-burning a portion of the cleaned flue gas flow that is not diverted.

3. A device according to claim 1, wherein the mixing means includes a mixing chamber having a housing adapted to enclose the flue gas feed line, and openings provided in the flue gas feed line so as to allow the clean gas to flow therethrough and mix with the flue gas.

4. A device according to claim 3, wherein the openings are constructed as slots.

5. A device according to claim 4, and further comprising means provided on edges of the slot openings in the flue gas feed line for assisting mixing of the clean gas with the flue gas.

6. A device according to claim 3, and further comprising dust feed means for metered admixing of dust particles with at least one of the diverted clean gas portion and the flue gas in the flue gas feed line.

7. A device according to claim 6, wherein the dust feed means is connected with the mixing chamber.

8. A device according to claim 6, and further comprising a pneumatic conveyor line having one end connected with the branch line and another end connected with the mixing chamber, and a fan arranged in the pneumatic conveyor line so as to conduct clean gas from the branch line to the mixing device, the dust feed means being connected in the pneumatic conveyor line.

* * * * *